6038X
PATENTED JUNE 19, 1830.
J. ESTLIN.
FURNACE FOR BURNING STONE, COAL, OR CHARCOAL.
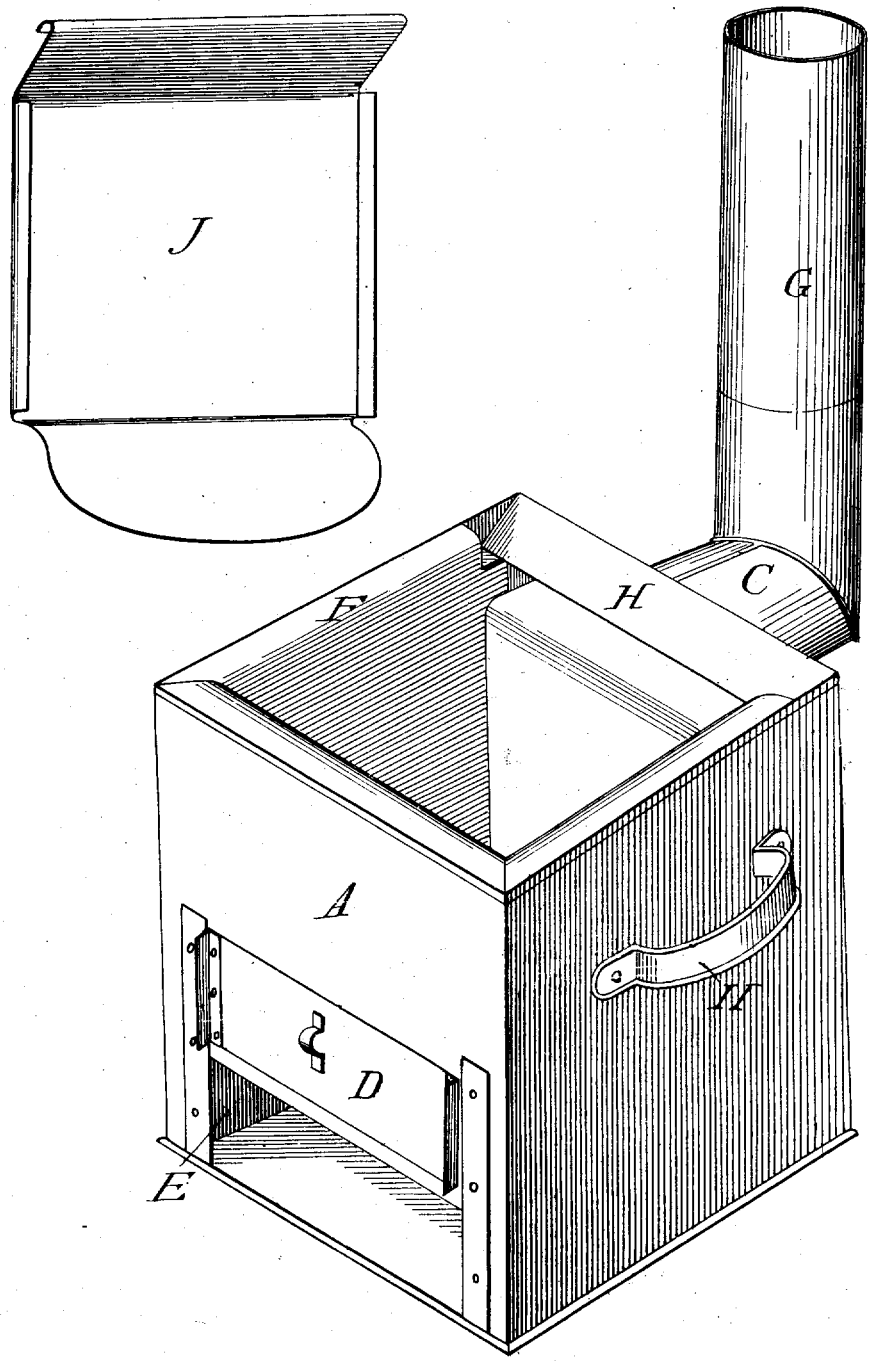
THE NORRIS PETERS CO. PHOTO-LITHO. WASHINGTON, D.C.

6038X

John Estlin
Letters Patent - Dated June 19th. 1830

The Schedule referred to in these Letters Patent, and making part of the same, containing a description in the words of the said John Estlin himself, of his Improvement in the Furnace for burning Stone coal, & Charcoal.

Know all men by these Presents, that I, John Estlin of the County of Philadelphia and State of Pennsylvania, have invented a new and useful Furnace for the burning of Stone Coal, or Charcoal, or either, and that the following is a full and exact description of the construction and operation of the said Furnace, as invented by me, to wit. A, represents the Box with a bottom to it, which may be made either of sheet iron or cast iron and wide at the top. B, Is a draft hole in the front part of said furnace. C, Is a piece of sheet iron pipe made round and fastened on the back part of said furnace, where the pipe G, is attached. D, Is a slide in the front part of said furnace, to slide over the draft hole to regulate the draft. There is a Grate in the inside of said furnace, and rests on flanges, which is made fast to the said box inside and leaves a space between the bottom and the grate, marked E. F, are fire bricks which are placed in the said box and rests on the flanges and grate and extends up to the top on the front and sides of the said box, but not so high in the back part, so as to leave room for the draft. G, Is a piece of sheet iron pipe with an Elbow to it, which is round and attached to the pipe marked C, at the back part of said furnace. H, Is a piece of sheet iron with a piece of common wrought iron fastened inside of it, - one edge of the sheet iron is turned over the the back edge of the box, and the other part slants down in the inside of the box towards the grate and is made fast; it extends over as far as the edge of the fire brick, which is next to the fire and on the back side of said box, and leaving an opening between it and the bricks for the draft to pass to the pipe. I, I, are the
handles one on each side of said box. J is a blower which is made
to shift on and off. The utility of the said Furnace consists in
the superiority over the common furnaces now in use, to wit, by the
application of Stone coal to the said furnace, which keeps its heat
much longer time than in the furnaces now in use, which can be
applied to Cooking of all kinds with very great advantage: one quar-
-ter of a peck of Stone coal put in said furnace will keep a very
good fire for Four hours and a half. Philadelphia, June 2nd 1830.

Witnesses.
Jacob Strembeck
Wm Vogdes

John Estlin

600

[illegible]